(12) United States Patent
Zhou et al.

(10) Patent No.: US 6,499,742 B1
(45) Date of Patent: Dec. 31, 2002

(54) BRUSH SEAL ASSEMBLY AND METHOD OF USING BRUSH SEAL ASSEMBLY

(75) Inventors: Ming Zhou, Reading, MA (US); Sal Albert Leone, Scotia, NY (US); Susan Marie Hyde, Piedmont, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/682,322

(22) Filed: Aug. 20, 2001

(51) Int. Cl.[7] ............................................. F16J 15/453
(52) U.S. Cl. ...................................... 277/355; 277/414
(58) Field of Search ................................ 777/355, 414, 777/415; 415/173.4, 174.4

(56) References Cited

U.S. PATENT DOCUMENTS

| | | | |
|---|---|---|---|
| 2,963,307 A | * 12/1960 | Bobo | |
| 3,537,713 A | * 11/1970 | Matthews et al. | |
| 3,547,455 A | * 12/1970 | Daunt | |
| 3,701,536 A | * 10/1972 | Matthews et al. | |
| 3,720,419 A | * 3/1973 | Adlizzi | 277/355 |
| 4,402,515 A | * 9/1983 | Malott | |
| 4,460,185 A | * 7/1984 | Grandey | 277/355 |
| 4,820,119 A | * 4/1989 | Joyce | 415/172 |
| 5,215,435 A | * 6/1993 | Webb et al. | 415/173.7 |
| 5,308,088 A | * 5/1994 | Atkinson et al. | 277/355 |
| 5,314,304 A | * 5/1994 | Wiebe | 415/173.4 |
| 5,752,805 A | * 5/1998 | Gail et al. | 415/229 |
| 5,967,746 A | * 10/1999 | Hagi et al. | 415/174.4 |
| 6,012,723 A | * 1/2000 | Beeck | 277/355 |
| 6,039,535 A | * 3/2000 | Kobayashi et al. | 415/172.1 |
| 6,045,134 A | * 4/2000 | Turnquist et al. | 277/347 |
| 6,105,967 A | * 8/2000 | Turnquist et al. | 277/355 |
| 6,116,612 A | * 9/2000 | Halliwell et al. | 277/412 |
| 6,217,277 B1 | * 4/2001 | Liu et al. | 415/9 |

* cited by examiner

*Primary Examiner*—Chuck Y. Mah
*Assistant Examiner*—Alison K. Pickard
(74) *Attorney, Agent, or Firm*—Hunton & Williams

(57) ABSTRACT

The invention provides a brush seal assembly, and method of using, for reducing adverse fluid flow effects to a brush seal, the brush seal assembly comprising a support housing having a passage; a rotating shaft disposed in the passage of the support housing, the rotating shaft including a shaft body having a periphery and an annular tooth extending around the periphery of the shaft body; and an annular brush seal including a plurality of bristles extending around the shaft body, each of the plurality of bristles attached to and extending from the support housing in the passage towards the rotating shaft. The brush seal assembly further includes an annular abradable material portion being constructed of an abradable material, the abradable material portion having a groove extending around an inner periphery thereof, the abradable material portion disposed in the passage around, and proximate to, the tooth of the rotating shaft such that the tooth of the rotating shaft is disposed in the groove of the abradable material portion.

26 Claims, 1 Drawing Sheet

BRUSH SEAL ASSEMBLY AND METHOD OF USING BRUSH SEAL ASSEMBLY

FIELD OF THE INVENTION

The invention relates to brush seals and methods of using brush seals.

BACKGROUND OF THE INVENTION

Brush seals are utilized in a wide variety of operating environments to provide a seal between a housing and a rotating shaft disposed in the housing, for example. Illustratively, brush seals may be utilized in power generation turbines.

For example, the rotating shaft may be a rotor in the power generation turbine. Brush seal construction typically includes thousands of bristles. Each bristle possesses a very small bristle diameter. Collectively, the bristles of the brush seal form a seal.

Brush seals are typically used in a wide variety of industrial applications. Such applications include gas turbine applications or steam turbine gas applications. Further, brush seals operate in severe flow environments, such as in high turbulence flow environments, unsteady flow fields, or flow environments in which there are very high swirl ratios. All these factors contribute to the instability and degradation of the bristles in the brush seal.

The thousands of bristles included in a brush seal are typically grouped together in a bristle pack, for example. Once the bristle pack becomes unstable, it should be appreciated that the life of the brush seal is significantly reduced due to the HCF (high-cycle fatigue) failure of bristles. HCF failure can occur very quickly when a component has a high level of response to a stimulus that occurs at the natural frequency of the component. In order to prevent bristle instability from occurring, one can either improve the brush seal design and/or improve the flow environment in which the brush seal will be operating.

BRIEF SUMMARY OF THE INVENTION

In accordance with one aspect, the invention provides a brush seal assembly for reducing adverse fluid flow effects to a brush seal, the brush seal assembly comprising a support housing having a passage; a rotating shaft disposed in the passage of the support housing, the rotating shaft including a shaft body having a periphery and an annular tooth extending around the periphery of the shaft body; an annular brush seal including a plurality of bristles extending around the shaft body, each of the plurality of bristles attached to and extending from the support housing in the passage towards the rotating shaft; and an annular abradable material portion being constructed of an abradable material, the abradable material portion having a groove extending around an inner periphery thereof, the abradable material portion disposed in the passage around, and proximate to, the tooth of the rotating shaft such that the tooth of the rotating shaft is disposed in the groove of the abradable material portion.

In accordance with a further aspect, the invention provides a brush seal assembly for reducing adverse fluid flow effects to a brush seal, the brush seal assembly comprising a support housing having a passage; a rotating shaft disposed in the passage of the support housing, the rotating shaft including a shaft body having a periphery and an annular tooth extending around the periphery of the shaft body; an annular brush seal including a plurality of bristles extending around the shaft body, each of the plurality of bristles attached to and extending from the support housing in the passage towards the rotating shaft; and an annular honeycomb assembly being constructed of a plurality of walled cells and having a groove extending around an inner periphery thereof, the honeycomb assembly disposed in the passage around, and proximate to, the tooth of the rotating shaft such that the tooth of the rotating shaft is disposed in the groove of the honeycomb assembly.

In accordance with a further aspect, the invention provides a method for reducing exposure of a brush seal to adverse fluid flow effects, the method comprising the steps of providing a support housing having a passage; providing a rotating shaft disposed in the passage of the support housing, the rotating shaft including a shaft body having a periphery and an annular tooth extending around the periphery of the shaft body; providing an annular brush seal including a plurality of bristles extending around the shaft body, each of the plurality of bristles attached to and extending from the support housing in the passage towards the rotating shaft; providing an annular honeycomb assembly, the annular honeycomb assembly disposed in the passage around, and proximate to, the tooth of the rotating shaft, the honeycomb assembly being constructed of a plurality of walled cells; circulating fluid in a space between the support housing and the rotating shaft, the circulated fluid possessing pressure fluctuations, the tooth and the honeycomb assembly each being positioned between the circulating fluid and the brush seal; and contacting the honeycomb assembly with the annular tooth so as to reduce exposure of the brush seal to the pressure fluctuations in the circulated fluid.

In accordance with a further aspect, the invention provides a brush seal assembly for reducing adverse fluid flow effects to a brush seal, the brush seal assembly comprising a support housing having a passage; a rotating shaft disposed in the passage of the support housing, the rotating shaft including a shaft body having a periphery and an annular tooth extending around the periphery of the shaft body, the shaft body and the annular tooth being integrally formed; an annular brush seal including a plurality of bristles extending around the shaft body, each of the plurality of bristles attached to and extending from the support housing in the passage towards the rotating shaft; and an annular honeycomb assembly being constructed Of a plurality of walled cells and having a groove extending around an inner periphery thereof, the honeycomb assembly disposed in the passage around, and proximate to, the tooth of the rotating shaft such that the tooth of the rotating shaft is disposed in the groove of the honeycomb assembly; an annular second honeycomb assembly, the second honeycomb assembly being constructed of a plurality of walled cells and having a groove extending around an inner periphery thereof; and the rotating shaft further including an annular second tooth extending around the periphery of the shaft body and spaced from the first tooth, the second honeycomb assembly disposed in the passage around, and proximate to, the second tooth such that the second tooth of the rotating shaft is disposed in the groove of the second honeycomb assembly; wherein the brush seal is disposed between the first honeycomb assembly and the second honeycomb assembly.

In accordance with a further aspect, the invention provides a method for reducing exposure of a brush seal to fluid fluctuations in an industrial gas turbine, the method comprising the steps of providing a support housing having a passage; providing a rotating shaft disposed in the passage of the support housing, the rotating shaft including a shaft body having a periphery and an annular tooth extending around the periphery of the shaft body, the shaft body being integrally formed with the tooth;providing an annular brush seal including a plurality of bristles extending around the shaft body, each of the plurality of bristles attached to and extending from the support housing in the passage towards the rotating shaft; providing an annular honeycomb assembly, the annular honeycomb assembly disposed in the passage around, and proximate to, the tooth of the rotating shaft, the honeycomb assembly being constructed of a plurality of walled cells, the honeycomb assembly further including a groove extending around an inner periphery of the honeycomb assembly; circulating fluid in the industrial gas turbine in a space between the support housing and the rotating shaft, the circulated fluid possessing pressure fluctuations, the tooth and the honeycomb assembly each being positioned between the circulating fluid and the brush seal; and contacting the honeycomb assembly with the annular tooth in the groove so as to reduce exposure of the brush seal to the pressure fluctuations in the circulated fluid.

In accordance with a further aspect, the invention provides a brush seal assembly for reducing adverse fluid flow effects to a brush seal, the brush seal assembly comprising a support housing having a passage; a rotating shaft disposed in the passage of the support housing, the rotating shaft including a shaft body having a periphery and an annular tooth extending around the periphery of the shaft body; an annular brush seal including a plurality of bristles extending around the shaft body, each of the plurality of bristles attached to and extending from the support housing in the passage towards the rotating shaft; and means for reducing adverse fluid flow effects to the brush seal having a groove extending around an inner periphery thereof, the means for reducing disposed in the passage around, and proximate to, the tooth of the rotating shaft such that the tooth of the rotating shaft is disposed in the groove.

In accordance with a yet further aspect, the invention provides a brush seal assembly for reducing adverse fluid flow effects to a brush seal in a gas turbine, the brush seal assembly comprising a support housing having a passage; a rotating shaft disposed in the passage of the support housing, the rotating shaft including a shaft body having a periphery and an annular tooth extending around the periphery of the shaft body, the tooth including a base portion and a contact portion; an annular brush seal including a plurality of bristles extending around the shaft body, each of the plurality of bristles attached to and extending from the support housing in the passage towards the rotating shaft; and means for reducing adverse fluid flow effects to the brush seal having a groove extending around an inner periphery thereof, the means for reducing disposed in the passage around, and proximate to, the tooth of the rotating shaft such that the tooth of the rotating shaft is disposed in the groove, the means for reducing disposed adjacent to the brush seal.

BRIEF DESCRIPTION OF THE DRAWINGS

The present invention can be more fully understood by reading the following detailed description together with the accompanying drawing, in which like reference indicators are used to designate like elements, and in which.

DETAILED DESCRIPTION OF THE INVENTION

Figure 1:
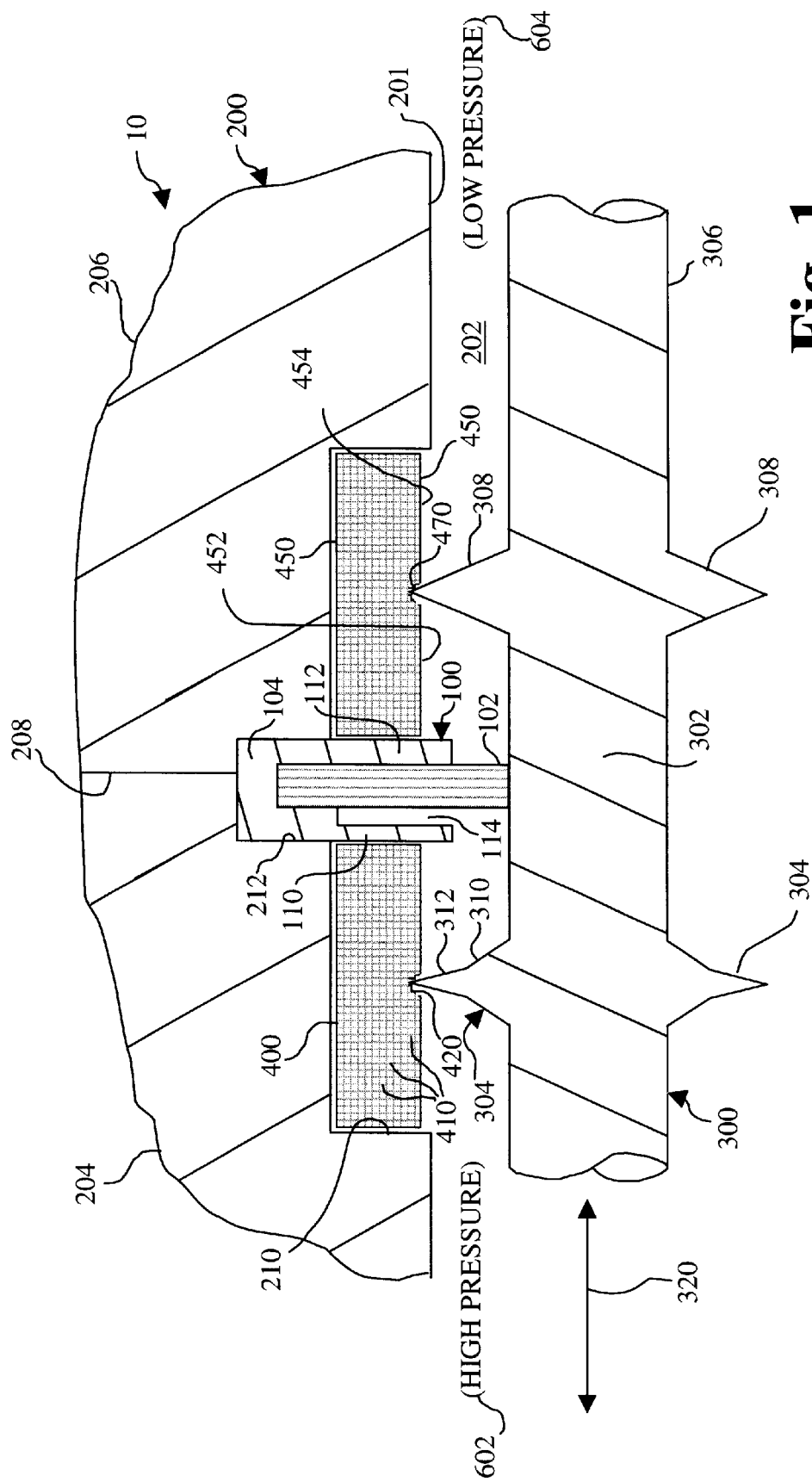
FIG. 1 is a cross-sectional diagram of a brush seal assembly in accordance with one embodiment of the invention.

Hereinafter, aspects of the brush seal assembly and methods of using the brush seal assembly in accordance with various embodiments of the invention will be described. As used herein, any term in the singular may be interpreted to be in the plural, and alternatively, any term in the plural may be interpreted to be in the singular.

The brush seal assembly and method of using the brush seal assembly of the invention are directed to the above stated problems, as well as other problems, that are present in conventional techniques.

The invention provides a brush seal assembly and method for improving brush seal stability. In accordance with some embodiments of the invention, a brush seal is installed behind "honeycomb teeth," i.e., a tooth and honeycomb arrangement. As a result, for example, before an upstream flow reaches the location of a brush seal, the upstream flow must pass by the narrow passage formed by the tooth positioned in the honeycomb material. As a result of the interaction of the upstream flow with the cells in the honeycomb material, the brush seal is protected from adverse fluid flow effects so as to provide less turbulence, smaller flow fluctuations, smaller circumferential pressure gradients, and a smaller swirl ratio, for example. By limiting such exposure of the brush seal, the stability of the bristles is improved.

FIG. 1 is a cross-sectional diagram showing the cross-section of annular brush seal assembly 10. As shown in FIG. 1, the brush seal assembly 10 includes a brush seal 100. The brush seal 100 includes bristles 102 as well as a brush seal support portion 104. The bristles 102 may be attached to and supported by the brush seal support portion 104 in any suitable manner. For example, the bristles 102 might be imbedded in the brush seal support portion 104 during a casting process of the brush seal support portion 104.

It should be appreciated that any of a wide-variety of brush seals 100 may be utilized in conjunction with the various embodiments of the invention. As shown in FIG. 1, a front plate 110 and a back plate 112 may provide support for the set of bristles 102. The front plate 110 may be spaced from the bristles 102 so as to provide a gap 114. A flexible damper shim (not shown) may be placed in the gap 114 up against the bristles 102, i.e., to keep the bristles 102 from fluttering without rigidly restricting the bristles.

As is shown in FIG. 1, the brush seal assembly 10 further includes a support housing 200. The brush seal 100 is positioned within and attached to the support housing 200. More specifically, the annular brush seal 100 is positioned in the support housing 200 in such a manner that the brush seal 100 surrounds a passage 202 extending through the support housing 200. That is, the passage 202 is formed by an inner surface 201 of the support housing. A rotating shaft 300 is disposed in the passage 202 in a rotatable manner. For example, the rotating shaft 300 may be the rotor shaft of a turbine, such as an industrial gas turbine. The bristles 102 of the brush seal 100 contact with the rotating shaft 300 in such a manner as to provide a seal between the bristles 102 and the rotating shaft 300, as is desired.

Illustratively, as shown in FIG. 1, the support housing 200 may include a slot 212. The slot 212 provides for the receipt of the brush seal support portion 104. The slot 212 may be in the form of a chamber or a cavity, for example.

The brush seal 100 may be attached to and supported by the support housing 200 in any suitable manner. Illustratively, the support housing 200 includes an upstream housing portion 204 and a downstream housing portion 206. The upstream housing portion 204 is separable from the downstream housing portion 206 at an interface junction 208. The interface junction 208 allows the upstream housing portion 204 to be separated from the downstream housing portion 206, such that the brush seal 100 may be positioned within the support housing 200 during assembly.

Alternatively, the support housing 200, for example a nozzle structure, may not be provided with the interface junction 208. Rather, a brush seal may be slid in from a side of the support housing 200 since the support housing may be segmented.

Accordingly, such illustrative assembly techniques described above are merely exemplary. The brush seal 100 and the support housing 200, as well as the honeycomb assembly 400 discussed further below, may be assembled in any suitable manner as desired. Further, the structure of the brush seal 100, the support housing 200 and the honeycomb assembly 400 may be designed to allow assembly as is desired.

As is shown in FIG. 1, the brush seal assembly 10 further includes an annular honeycomb assembly 400. In a manner similar to the brush seal 100, the honeycomb assembly 400 is formed into an annular shape, a cross-section of which is shown in FIG. 1, such that the honeycomb assembly 400 encircles the passage 202 as well as the rotating shaft 300. The honeycomb assembly 400 may be positioned and secured within the support housing 200 in any suitable manner. For example, the honeycomb assembly 400 may simply be retained between the brush seal 100 and a wall 210 of the support housing 200.

The honeycomb assembly 400 is constructed of a plurality of cells 410. The cells 410 are defined by an array of walls extending throughout the honeycomb assembly 400. The properties of the honeycomb assembly 400 may vary widely depending on the particular operating environment in which the brush seal assembly 10 is being utilized and/or cost considerations, for example. Accordingly, the size of each respective cell 410 of the honeycomb assembly 400 may vary, as well as the material used to construct the walls that form the cells 410. Also, the size of the walls forming the honeycomb assembly 400, which define the cells 410, may vary in thickness, for example. The honeycomb assembly 400 further includes a groove 420. The groove 420 interacts with the rotating shaft 300. Further aspects of the groove 420 and its interaction with the rotating shaft 300 will be described in further detail below.

It should be appreciated that the brush seal assembly 10, including the brush seal 100 and the honeycomb assembly 400, in accordance with some embodiments of the invention, does not have to be a full circle. Rather, a brush seal and/or honeycomb assembly, utilizing the techniques of the invention, might each be made up of annular segments. Such annular segments might be joined so as to form a complete circle, i.e., so as to provide a brush seal and/or a honeycomb assembly that forms a complete circle.

In accordance with the embodiment of the invention shown in FIG. 1, the brush seal assembly 10 further includes a second honeycomb assembly 450. Illustratively, the second honeycomb assembly 450 may be constructed so as to be identical to the honeycomb assembly 400 described above. Alternatively, it should be appreciated that the second honeycomb assembly 450 may be constructed differently. This different construction might result from the presence of high pressure adjacent to the honeycomb assembly 400, in contrast to low pressure adjacent to the second honeycomb assembly 450. The second honeycomb assembly 450 also possesses a groove 470, in a manner similar to the groove 420 of the honeycomb assembly 400. However, it should be appreciated that the second honeycomb assembly 450 is optional and may not be desired in some implementations of the invention.

The brush seal assembly 10 further includes the rotating shaft 300, as described above. For example, the rotating shaft 300 may be the rotor shaft of a turbine. As shown in FIG. 1, the rotating shaft 300 includes a shaft body 302. At least one annular tooth 304 is positioned upon and around the rotating shaft 300, i.e., so as to encircle the rotating shaft 300. In other words, the annular tooth 304 extends around a periphery 306 of the rotating shaft 300. The rotating shaft 300 may typically be cylindrically shaped. In accordance with one embodiment of the invention, the annular tooth 304 may be integrally formed with the rotating shaft 300.

In accordance with the embodiment shown in FIG. 1, a plurality of annular teeth may be disposed on the shaft body 302. That is, the rotating shaft 300 may further include a second annular tooth 308. The second tooth 308 may be constructed so as to be identical to the annular tooth 304. Alternatively as shown in FIG. 1, the second annular tooth 308 may be constructed differently than the annular tooth 304. This might be desired based on the particular operating environment of the brush seal assembly 10. Further, it should be appreciated that while the brush seal assembly 10 of FIG. 1 illustrates a second annular tooth 308, only a single tooth might be utilized. Further, additional annular teeth may be utilized, i.e., in addition to the two annular teeth shown in FIG. 1.

As shown in FIG. 1, the annular tooth 304 includes a tooth base portion 310 and a tooth contact portion 312. The tooth base portion 310 is connected to the shaft body 302 and provides a base for the tooth contact portion 312. Accordingly, the tooth contact portion 312 is supported upon the tooth base portion 310. The tooth contact portion 312 may be integrally formed with the tooth base portion 310, as well as with the shaft body 302.

The tooth contact portion 312 is positioned proximate to the honeycomb assembly 400. In particular, the tooth contact portion 312 is positioned proximate to the honeycomb assembly 400 such that the tooth contact portion 312 is in physical contact with the honeycomb assembly 400, for example. As used herein, the term "proximate" means that the tooth contact portion 312 is positioned sufficiently close to the honeycomb assembly 400 such that the desired protection, i.e., from turbulence for example, is provided to the brush seal 100.

As shown in FIG. 1, the honeycomb assembly 400 includes the groove 420. The groove 420 may be formed in a variety of manners. Illustratively, a new turbine system, i.e., a turbine system that has not been used, might be provided with the brush seal assembly 10 as shown in FIG. 1. In accordance with one embodiment, the groove 420 is generated, not during manufacture, but rather during the initial use of the brush seal assembly 10. To explain, the annular tooth 304, and specifically the tooth contact portion 312, may be positioned close to the honeycomb assembly 400, but such that the tooth contact portion 312 is not in contact with the honeycomb assembly 400 prior to operation of the brush seal assembly 10.

Upon the initial operation of the brush'seal assembly 10, heating occurs in the rotating shaft 300, as well as the other components of the brush seal assembly 10.

This heating may cause the orientation of the various components of the brush seal assembly 10 to change relative to each other. In particular, the orientation of the annular tooth 304 with respect to the honeycomb assembly 400 will change in that the rotating shaft 300, including the annular tooth 304, will expand due to heating. This expansion will cause the annular tooth 304 to effectively "grow" such that the tooth contact portion 312 "wears" the groove 420 in the cells 410 of the honeycomb assembly 400.

As a result of the annular tooth 304 wearing or cutting its way into the honeycomb assembly 400, a close fit will be created between the tooth contact portion 312 and the honeycomb assembly 400. This interrelationship will provide a barrier to adverse fluid flow effects including turbulence, flow fluctuations, circumferential pressure gradients, and swirl ratio, for example, all of which might otherwise be experienced by and degrade the brush seal 100. A beneficial attribute of the annular tooth 304 wearing or cutting the groove 420 into the honeycomb assembly 400 is that the annular tooth 304 does not need to be particularly aligned with a groove 420 during assembly of the brush seal assembly 10. That is, so long as the annular tooth 304 is positioned somewhere along the width of the honeycomb assembly 400, the annular tooth 304 will cut into the honeycomb assembly 400, i.e., providing the groove 420 at the appropriate position along the axis 320 of the rotating shaft 300.

To explain further, the tooth 304 may be constructed of material such that the tooth is proximate to the honeycomb assembly 400 in a cold state during nonoperation of the brush seal assembly. In contrast, the tooth 304 may be physically in contact with the honeycomb assembly in a hot state during operation of the brush seal assembly. That is, the hot state being hotter in temperature than the cold state results in the tooth 304 "growing" into the honeycomb assembly 400.

Alternatively, in accordance with a further embodiment of the invention, the groove 420 may be actually formed into the honeycomb assembly 400 during manufacturing of the honeycomb assembly 400. This might be desirable as a result of the relative strength of the materials utilized in each of the honeycomb assembly 400 and the rotating shaft 300.

As described above, the tooth 304 may be physically in contact with the honeycomb assembly 400 in a hot state during operation of the seal assembly. However, the tooth 304 does not have to be in physical contact with the honeycomb assembly 400 for effective operation in accordance with some embodiments of the invention. Rather, the tooth 304 merely should be positioned in the groove 420. That is, if the tooth 304 is in the groove 420, this forces the fluid to go through a torturous path to get to the brush seal and, as a result, this reduces any pressure fluctuations, for example.

As is shown in FIG. 1, the annular tooth 304 protects the brush seal 100 from a high pressure area 602, which might be characterized as being upstream from the brush seal 100. Further, the second annular tooth 308 protects the brush seal 100 from a low pressure area 604, which might be characterized as being downstream from the brush seal 100. It should be appreciated that any of a wide-variety of arrangements of the honeycomb assemblies and/or annular teeth (304, 308), as well as additional teeth and/or honeycomb assemblies may be utilized. Further, the low pressure area 604 may be of such limited affect that the second annular tooth 308 and honeycomb assembly 450 may not be necessary or desired to protect the brush seal 100. In contrast, more than one annular tooth might be desired to protect the brush seal, i.e., from turbulence, for example, of the low pressure area 604.

As shown in FIG. 1, the honeycomb assembly 450, in accordance with one embodiment of the invention, includes a plurality of annular surfaces (452, 454) exposed to the passage. Each annular surface (452, 454) consists of a substantially uninterrupted honeycomb surface on one side of the groove 470 in which the annular tooth 308 is disposed, as in FIG. 1.

As is shown in FIG. 1, the annular tooth 304 is constructed to include a tooth base portion 310 and a tooth contact portion 312. However, any of a wide-variety of constructions may be utilized. Further, a variety of shapes may be utilized for the annular tooth 304, for example, as is shown by the different shape of the tooth 308 as compared to the tooth 304. For example, a single annular tooth may include two or more tooth contact portions 312. Further, it is not necessary that the tooth contact portion 312 be constructed in the shape of a pyramid, i.e., as shown in FIG. 1. Alternatively, a particular operating environment may be conducive to the tooth contact portion 312 being formed in the shape of a plateau, for example, or other shape.

As described above, the honeycomb assembly 400 includes a plurality of cells 410. The honeycomb assembly 400, as a result of its construction and the material from which it is constructed, provides for the tooth 304, for example, to wear a groove 420 into the honeycomb assembly 400. However, it should be appreciated that the invention is not limited to use of a honeycomb material. To explain, the honeycomb material as shown in FIG. 1 may be characterized as an "annular abradable material portion" that is constructed of an "abradable material" or an "abradable coating," i.e., meaning that the tooth 304 can abrade or rub into the material or coating so as to form a groove 420. The tooth 304 is then positioned within the groove 420 during operation. However, other abradable materials might be used, for the annular abradable material portion, instead of the honeycomb material. That is, another material may be used in lieu of the honeycomb material so long as such other material is abradable.

Various aspects of the honeycomb assembly 400 are described above. As described above, the construction of the honeycomb assembly 400 is homogeneous throughout the plurality of cells 410. Each of the cells 410 are defined by a plurality of walls. However, it is not necessary that the honeycomb assembly 400 be homogeneous throughout. For example, a single honeycomb assembly 400 may be in contact with and operate with multiple annular teeth.

Illustratively, it may be desirable that a portion of the honeycomb assembly 400 that interacts with a first tooth be different than the portion of the honeycomb assembly 400 that interacts with a second tooth. Accordingly, the mechanical properties of the honeycomb assembly 400 may vary throughout. The honeycomb assembly (400, 450) may be made in any suitable manner, as is known in the art.

Further, it may be desirable to mount the honeycomb assembly 400 on a suitable supporting substrate. Such a supporting substrate might be beneficial in assembling of the honeycomb assembly 400 in the brush seal assembly 10, for example.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure, which includes the attachments, is only illustrative and exemplary of the present invention and is made to provide an enabling disclosure of the invention Accordingly, the foregoing disclosure is not intended to be construed or to limit the present invention or otherwise to exclude any other such embodiments, adaptations, variations, modifications and equivalent arrangements.

What is claimed is:

1. A brush seal assembly for reducing adverse fluid flow effects to a brush seal to prolong the life of the brush seal, the brush seal assembly comprising:

a support housing having a passage;

a rotating shaft disposed in the passage of the support housing, the rotating shaft including a shaft body having a periphery and an annular tooth extending around the periphery of the shaft body;

an annular brush seal including a plurality of bristles extending around the shaft body, each of the plurality of bristles attached to and extending from the support housing in the passage towards the rotating shaft; and an annular honeycomb assembly being constructed of a plurality of walled cells, the honeycomb assembly having a groove extending around an inner periphery thereof, the honeycomb assembly disposed in the passage around, and proximate to, the tooth of the rotating shaft such that the tooth of the rotating shaft is disposed in the groove of the honeycomb assembly, the groove being formed by the tooth contacting and wearing into the honeycomb assembly.

2. The brush seal assembly according to claim 1, further comprising:

a second honeycomb assembly, the second honeycomb assembly being constructed of a honeycomb material and having a groove extending around an inner periphery thereof; and the rotating shaft further including an annular second tooth extending around the periphery of the shaft body and spaced from the first tooth, the second, honeycomb assembly disposed in the passage around, and proximate to, the second tooth such that the second tooth of the rotating shaft is disposed in the groove of the second honeycomb assembly.

3. The brush seal assembly according to claim 2, wherein the brush seal is disposed between the first honeycomb assembly and the, second honeycomb assembly.

4. The brush seal assembly according to claim 3, wherein the brush seal is disposed immediately adjacent to each of the first honeycomb assembly and the second honeycomb assembly along the passage.

5. The brush seal assembly according to claim 1, wherein the tooth is in physical contact with the honeycomb assembly in the groove of the honeycomb assembly.

6. A brush seal assembly for reducing adverse fluid flow effects to a brush seal, the brush seal assembly comprising:

a support housing having a passage;

a rotating shaft disposed in the passage of the support housing, the rotating shaft including a shaft body having a periphery and an annular tooth extending around the periphery of the shaft body;

an annular brush seal including a plurality of bristles extending around the shaft body, each of the plurality of bristles attached to and extending from the support housing in the passage towards the rotating shaft; and an annular honeycomb assembly being constructed of a plurality of walled cells and having a groove extending around an inner periphery thereof, the honeycomb assembly disposed in the passage around, and proximate to, the tooth of the rotating shaft such that the tooth of the rotating shaft is disposed in the groove of the honeycomb assembly; and wherein the annular honeycomb assembly includes a plurality of annular surfaces exposed to the passage, each annular surface consisting of a substantially uninterrupted honeycomb surface on one side of the groove in which the tooth is disposed; and wherein the tooth is in physical contact with the honeycomb assembly in the groove of the honeycomb assembly.

7. The brush seal assembly according to claim 6, further comprising:

an annular second honeycomb assembly, the second honeycomb assembly being constructed of a plurality of walled cells and having a groove extending around an inner periphery thereof; and the rotating shaft further including an annular second tooth extending around the periphery of the shaft body and spaced from the first tooth, the second honeycomb assembly disposed in the passage around, and proximate to, the second tooth such that the second tooth of the rotating shaft is disposed in the groove of the second honeycomb assembly.

8. The brush seal assembly according to claim 7, wherein the brush seal is disposed between the first honeycomb assembly and the second honeycomb assembly.

9. The brush seal assembly according to claim 8, wherein the brush seal is disposed immediately adjacent to each of the first honeycomb assembly and the second honeycomb assembly along the passage.

10. The brush seal assembly according to claim 6, wherein the brush seal is disposed immediately adjacent to the honeycomb assembly along the passage.

11. The brush seal assembly according to claim 6, wherein the tooth includes a tooth base portion and a tooth contact portion connected to the tooth base portion, the tooth base portion connected to the rotating shaft and providing a base for the tooth contact portion.

12. The brush seal assembly according to claim 6, wherein the tooth is constructed of material such that the tooth is proximate to the honeycomb assembly in a cold state during non-operation of the brush seal assembly and physically in contact with the honeycomb assembly in a hot state during operation of the brush seal assembly, the hot state being hotter in temperature than the cold state.

13. The brush seal assembly according to claim 6, wherein the brush seal further includes a support portion, the support portion being attached to the support housing, the plurality of bristles connected to and extending from the support portion.

14. The brush seal assembly according to claim 13, wherein the support housing includes a slot, the support portion being disposed in the slot of the support housing.

15. The brush seal assembly according to claim 6, wherein the shaft body and the annular tooth are integrally formed.

16. The brush seat assembly according to claim 6, wherein the passage of the support housing defines a cylindrical cavity, the rotating shaft positioned in the cylindrical cavity.

17. A method for reducing exposure of a brush seal to adverse fluid flow effects to prolong the life of the brush seal, the method comprising the steps of:

providing a support housing having a passage;

providing a rotating shaft disposed in the passage of the support housing, the rotating shaft including a shaft body having a periphery and an annular, tooth extending around the periphery of the shaft body;

providing an annular brush seal including a plurality of bristles extending around the shaft body, each of the plurality of bristles attached to and extending from the support housing in the passage towards the rotating shaft;

providing an annular honeycomb assembly, the annular honeycomb assembly disposed in the passage around, and proximate to, the tooth of the rotating shaft, the honeycomb assembly being constructed of a plurality of walled cells;

circulating fluid in a space between the support housing and the rotating shaft, the circulated fluid possessing pressure fluctuations, the tooth and the honeycomb assembly each being positioned between the circulating fluid and the brush seal; and contacting the honeycomb assembly with the annular tooth so as to reduce exposure of the brush seal to the pressure fluctuations in the circulated fluid.

18. The method according to claim 17, wherein the honeycomb assembly further includes a groove extending around an inner periphery of the honeycomb assembly, the annular tooth being positioned in the groove so as to reduce exposure of the brush seal to the pressure fluctuations in the circulated fluid.

19. The method according to claim 18, further including the step of wearing the groove in the honeycomb assembly by contact of the honeycomb assembly with the tooth.

20. The method according to claim 17, further including the step of wearing the honeycomb assembly by contact of the honeycomb assembly with the tooth.

21. A brush seal assembly for reducing adverse fluid flow effects to a brush seal, the brush seal assembly comprising:

a support housing having a passage;

a rotating shaft disposed in the passage of the. support housing, the rotating shaft including a shaft body having a periphery and an annular tooth extending around the periphery of the shaft body, the shaft body and the annular tooth being integrally formed;

an annular brush seal including a plurality of bristles extending around the shaft body, each of the plurality of bristles attached to and extending from the support housing in the passage towards the rotating shaft; and an annular honeycomb assembly being constructed of a plurality of walled cells and having a groove extending around an inner periphery thereof, the honeycomb assembly disposed in the passage around, and proximate to, the tooth of the rotating shaft such that the tooth of the rotating shaft is disposed in the groove of the honeycomb assembly;

wherein the annular honeycomb assembly includes a plurality of annular surfaces exposed to the passage, each annular surface consisting of a substantially uninterrupted honeycomb surface on one side of the groove in which the tooth of the rotating shaft is disposed; and an annular second honeycomb assembly, the second honeycomb assembly being constructed of a plurality of walled cells and having a groove extending around an inner periphery thereof; and the rotating shaft further including an annular second tooth extending around the periphery of the shaft body and spaced from the first tooth, the second honeycomb assembly disposed in the passage around, and proximate to, the second tooth such that the second tooth of the rotating shaft is disposed in the groove of the second honeycomb assembly;

wherein the brush seal is disposed between the first honeycomb assembly and the second honeycomb assembly; and wherein the second annular honeycomb assembly includes a plurality of annular surfaces exposed to the passage, each annular surface of the second annular honeycomb assembly consisting of a substantially uninterrupted honeycomb surface on one side of the groove of the annular second honeycomb assembly in which the annular second tooth is disposed.

22. A method for reducing exposure of a brush seal to fluid fluctuations in an industrial gas turbine to prolong the life of the brush seal, the method comprising the steps of;

providing a support housing having a passage;

providing a rotating shaft disposed in the passage of the support housing, the rotating shaft including a shaft body having a periphery and an annular tooth extending around the periphery of the shaft body, the shaft body being integrally formed with the tooth;

providing an annular brush seal including a plurality of bristles extending around the shaft body, each of the plurality of bristles attached to and extending from the support housing in the passage towards the rotating shaft;

providing an annular honeycomb assembly, the annular honeycomb assembly disposed in the passage around, and proximate to, the tooth of the rotating shaft, the honeycomb assembly being constructed of a plurality of walled cells, the honeycomb assembly further including a groove extending around an inner periphery of the honeycomb assembly;

circulating fluid in the industrial gas turbine in a space between the support housing and the rotating shaft, the circulated fluid possessing pressure fluctuations, the tooth and the honeycomb assembly each being positioned between the circulating fluid and the brush seal; and contacting the honeycomb assembly with the annular tooth in the. groove so as to reduce exposure of the brush seal to the pressure fluctuations in the circulated fluid; and wherein the annular honeycomb assembly includes a plurality of annular surfaces exposed to the passage, each annular surface consisting of one substantially uninterrupted honeycomb surface on one side of the groove in which the tooth is disposed.

23. The method according to claim 22, further including the step of wearing the groove in the honeycomb assembly by contact of the honeycomb assembly with the tooth.

24. A brush seal assembly for reducing adverse fluid flow effects to a brush seal to prolong the life of the brush seal, the brush seal assembly comprising:

a support housing having a passage;

a rotating shaft disposed in the passage of the support housing, the rotating shaft including a shaft body having a periphery and an annular tooth extending around the periphery of the shaft body;

an annular brush seal including a plurality of bristles extending around the shaft body, each of the plurality of bristles attached to and extending from the support housing in the passage towards the rotating shaft; and an annular honeycomb assembly being constructed of a plurality of walled cells, the honeycomb assembly having a groove extending around an inner periphery thereof, the honeycomb assembly disposed in the passage around, and proximate to, the tooth of the rotating shaft such that the tooth of the rotating shaft is disposed in the groove of the honeycomb assembly; and wherein the tooth is in physical contact with the honeycomb assembly in the groove of the honeycomb assembly.

25. The brush seal assembly according to claim 24, further comprising:

a second honeycomb assembly, the second honeycomb assembly being constructed of a honeycomb material and having a groove extending around an inner periphery thereof; and the rotating shaft further including an annular second tooth extending around the periphery of the shaft body and spaced from the first tooth, the second honeycomb assembly disposed in the passage around, and proximate to, the second tooth such that the second tooth of the rotating shaft is disposed in the groove of the second honeycomb assembly.

26. The brush seal assembly according to claim 25, wherein the brush seal is disposed between the first honeycomb assembly and the second honeycomb assembly.

* * * * *